United States Patent
Auffray et al.

(10) Patent No.: US 11,981,448 B2
(45) Date of Patent: May 14, 2024

(54) METHOD FOR POSITIONING A RAM AIR TURBINE OF AN AIRCRAFT DURING ITS ASSEMBLY

(71) Applicant: Airbus Operations SAS, Toulouse (FR)

(72) Inventors: Stéphane Auffray, Saint Lyphard (FR); Janick Migne, Saint-Nazaire (FR); Gildas Maltete, Orvault (FR); Jean-Gilles Dousset, Frossay (FR)

(73) Assignee: Airbus Operations SAS, Toulouse (FR)

( * ) Notice: Subject to any disclaimer, the term of this patent is extended or adjusted under 35 U.S.C. 154(b) by 217 days.

(21) Appl. No.: 17/721,399

(22) Filed: Apr. 15, 2022

(65) Prior Publication Data

US 2022/0332432 A1    Oct. 20, 2022

(30) Foreign Application Priority Data

Apr. 19, 2021 (FR) ........................... 2104068

(51) Int. Cl.
*B64D 41/00* (2006.01)
(52) U.S. Cl.
CPC .................. *B64D 41/007* (2013.01)
(58) Field of Classification Search
CPC ........... B64D 41/007; B64D 45/0005
See application file for complete search history.

(56) References Cited

U.S. PATENT DOCUMENTS

| 4,717,095 A | 1/1988 | Cohen et al. |
| 9,714,098 B2 | 7/2017 | Russ et al. |
| 2020/0262588 A1 | 8/2020 | Nakhjavani |

OTHER PUBLICATIONS

French Search Report; priority document.

*Primary Examiner* — Justin D Seabe
*Assistant Examiner* — John S Hunter, Jr.
(74) *Attorney, Agent, or Firm* — Greer, Burns & Crain, Ltd.

(57) ABSTRACT

A method for positioning a ram air turbine during its assembly on a primary structure of an aircraft. The method includes the steps of: placing a first distance sensor on a first element among a first flap and the ram air turbine, a second distance sensor on a second element among a second flap and the ram air turbine, the first and second distance sensors being configured to respectively emit first and second signals corresponding to measured values over time of a distance between each of the first and second distance sensors and at least one mobile target attached to the ram air turbine or the first and second flap, pivoting the mast between the retracted and deployed positions, analyzing the first and second signals, and, if necessary, repositioning the ram air turbine according to the step of analyzing the first and second signals.

10 Claims, 7 Drawing Sheets

METHOD FOR POSITIONING A RAM AIR TURBINE OF AN AIRCRAFT DURING ITS ASSEMBLY

CROSS-REFERENCES TO RELATED APPLICATIONS

This application claims the benefit of the French patent application No. 2104068 filed on Apr. 19, 2021, the entire disclosures of which are incorporated herein by way of reference.

FIELD OF THE INVENTION

The present invention relates to a method for positioning a ram air turbine of an aircraft when mounting same.

BACKGROUND OF THE INVENTION

According to one embodiment, an aircraft comprises a ram air turbine, also referred to as RAT, producing the energy necessary for the vital systems of the aircraft in the event of an emergency upon the loss of other energy sources. Such a ram air turbine comprises a base fixed onto the primary structure of the aircraft, a mast extending between first and second ends, an articulation linking the first end of the mast and the base, and a turbine secured to the second end of the mast. The mast is mobile between a retracted position in which the ram air turbine is positioned inside the fairing of the aircraft and a deployed position in which a part of the mast and the turbine are positioned outside the fairing.

To allow the mast to pass, the fairing includes an opening and trapdoors that are mobile between a closed position in which they block the opening and an open position in which they free the opening. In the open position, the two trapdoors are spaced apart to allow the mast to pivot. These trapdoors are dimensioned to allow the passage of the ram air turbine while being as small as possible to limit the wind resistance when they are in the open position and not overly impact the aerodynamics of the aircraft. Also, the separation between the ram air turbine and each trapdoor during the deployment and return movements is calculated to the nearest point.

During mounting, the base of the ram air turbine must be correctly positioned with respect to the primary structure of the aircraft in order for the turbine (and more particularly its blades) not to interfere with the trapdoors during the deployment and return movements. This positioning depends essentially on the dexterity and the skill of the operator.

SUMMARY OF THE INVENTION

The present invention aims to remedy the drawbacks of the prior art by proposing a solution that simplifies the positioning of the ram air turbine when it is being mounted.

To this end, a subject of the invention is a method for positioning a ram air turbine when mounting same on a primary structure of an aircraft, the ram air turbine comprising a mast configured to pivot between deployed and retracted positions and a turbine secured to the mast and provided with blades, the aircraft comprising first and second trapdoors each having a free edge and configured to occupy a closed position in which the free edges are attached to one another and an open position in which the free edges are separated to allow the mast to pivot.

According to the invention, the positioning method comprises:
 a. a step of placing
  i. a first distance sensor on a first element out of the first trapdoor and the ram air turbine,
  ii. a second distance sensor on a second element out of the second trapdoor and the ram air turbine,
  iii. the first and second distance sensors being configured to respectively transmit first and second signals corresponding to values measured over time of a separation between each of the first and second distance sensors, and at least one target is mobile and secured to a third element out of the first trapdoor and the ram air turbine different from the first element for the first distance sensor and to a fourth element out of the second trapdoor and the ram air turbine different from the second element for the second distance sensor,
 b. a step of pivoting the mast between the retracted and deployed positions,
 c. a step of analyzing the first and second signals, and
 d. if necessary, a step of repositioning the ram air turbine based on the step of analyzing the first and second signals.

The positioning method of the invention allows a more reliable and reproducible positioning of the ram air turbine.

According to another feature, the first signal comprises a first extreme value corresponding to the smallest separation between the first distance sensor and the target. In parallel, the second signal comprises a second extreme value corresponding to the smallest separation between the second distance sensor and the target.

When the first and second extreme values of the first and second signals are equal, the ram air turbine is correctly positioned.

If the first and second extreme values of the first and second signals are not equal, the steps of pivoting the mast, of analyzing the first and second signals and of repositioning the ram air turbine based on the step of analyzing the first and second signals are repeated until the first and second extreme values of the first and second signals are equal.

According to another feature, the first and second distance sensors are configured so that each first or second extreme value of the first or second signal is substantially proportional to the real minimum separation separating the first or second distance sensor and its target.

According to another feature, the positioning method comprises a step of determining a ratio between the first or second extreme value of the first or second signal and the real minimum separation, a step of comparing the first and second extreme values and a step of determining, based on the comparison step and knowing the ratio, a direction and a value of displacement of the ram air turbine for it to be correctly positioned.

According to another feature, each first or second distance sensor is an eddy current sensor.

According to another feature, the first and second distance sensors are differentially mounted.

According to a first embodiment, the first and second sensors are fixed onto the first and second trapdoors, at least one of the metal blades ensuring the target function.

According to a second embodiment, the first and second sensors are fixed onto the ram air turbine, each of the first and second trapdoors comprising a metal target.

BRIEF DESCRIPTION OF THE DRAWINGS

Other features and advantages will emerge from the following description of the invention, a description given purely by way of example, in light of the attached drawings in which.

DETAILED DESCRIPTION OF THE PREFERRED EMBODIMENTS

Figure 1:
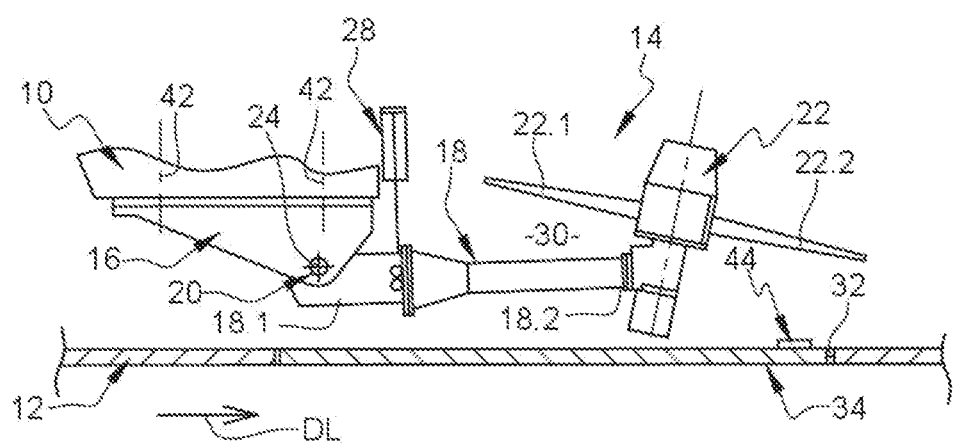
FIG. 1 is a side view of a part of an aircraft and of a ram air turbine in retracted position.

As illustrated schematically in FIGS. 1 to 5, an aircraft comprises a primary structure 10 and a fairing 12 enclosing the primary structure 10.

The aircraft also comprises at least one ram air turbine 14 which comprises a base 16 fixed onto the primary structure 10, a mast 18 extending between first and second ends 18.1, 18.2, an articulation 20 linking the first end 18.1 of the mast 18 and the base 16, and a turbine 22 secured to the second end 18.2 of the mast 18. This turbine 22 has blades 22.1, 22.2, for example made of metal.

Figure 2:
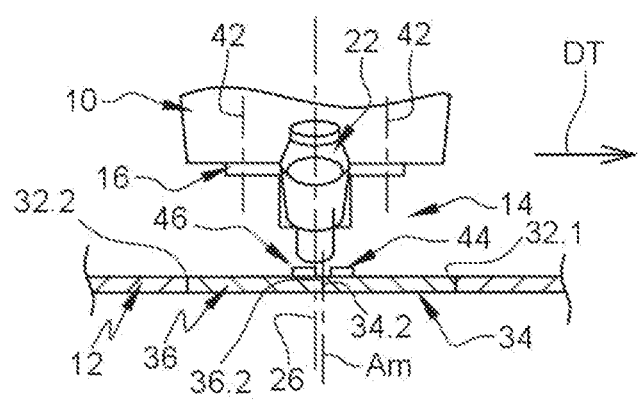
FIG. 2 is a front view of a part of the aircraft and of the ram air turbine visible in FIG. 1.
Figure 3:
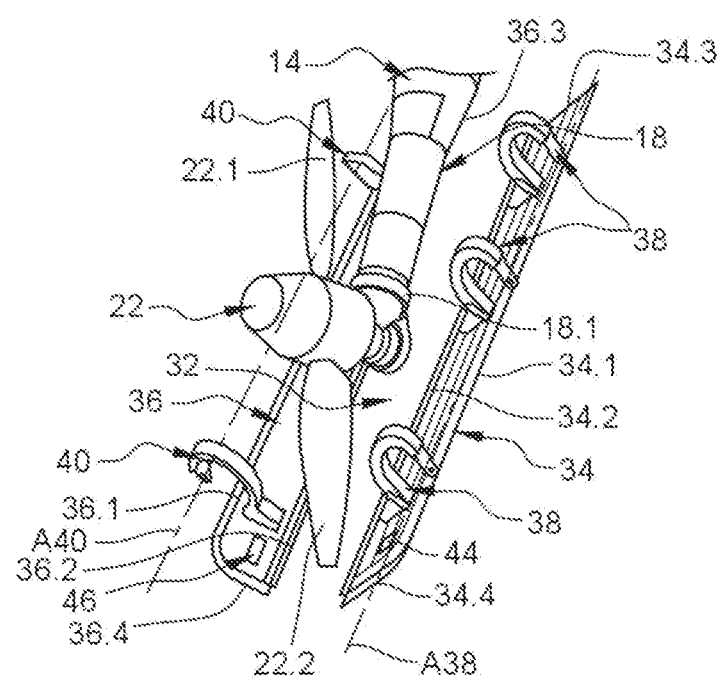
FIG. 3 is a perspective view of the trapdoors of the fairing of an aircraft in open position and of a ram air turbine during deployment.
Figure 4:
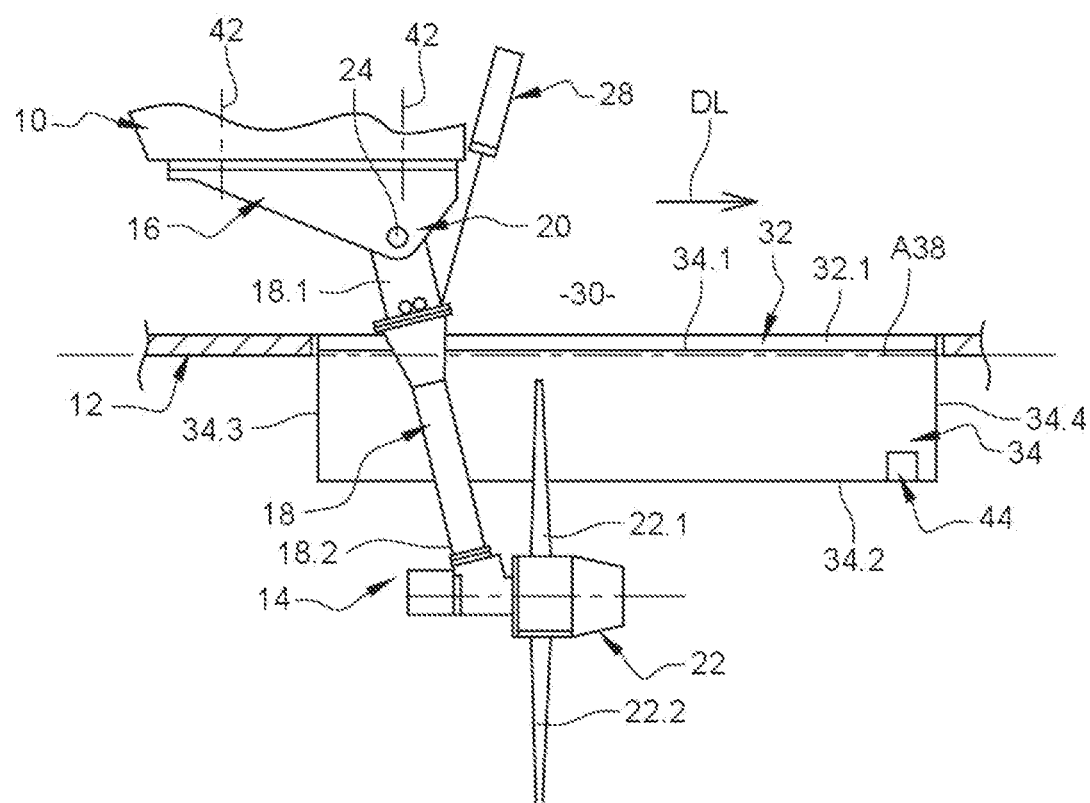
FIG. 4 is a side view of a part of the aircraft and of the ram air turbine visible in FIG. 1, the ram air turbine being in deployed position.
Figure 5:
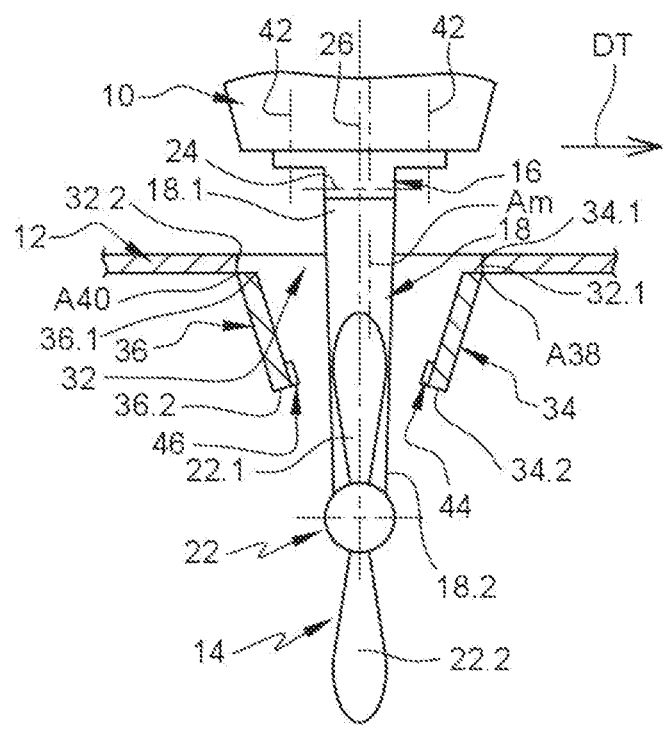
FIG. 5 is a front view of a part of the aircraft and of the ram air turbine visible in FIG. 1, the ram air turbine being in deployed position.

The mast 18 is mobile between a retracted position, visible in FIGS. 1 and 2, in which the ram air turbine 14 is positioned inside the fairing 12 of the aircraft, and a deployed position, visible in FIGS. 4 and 5, in which a part of the mast 18 and the turbine 22 are positioned outside the fairing 12.

According to one configuration, the articulation 20 is configured to allow the mast 18 to pivot about a pivoting axis 24 and to be displaced in a plane, called plane of displacement 26, at right angles to the pivoting axis 24. Hereinafter in the description, a longitudinal direction DL is contained in the plane of displacement 26 and approximately parallel to the fairing 12. A transverse direction DT is at right angles to the plane of displacement 26.

In addition, the aircraft comprises an actuator 28 for controlling the pivoting movements of the mast 18 between the deployed and retracted positions, and a housing 30 inside the fairing 12 in which the ram air turbine 14 is positioned in the retracted position. To allow the mast 18 and the turbine 22 to pass, the fairing 12 comprises an opening 32 and first and second trapdoors 34, 36 that are mobile between a closed position in which the first and second trapdoors 34, 36 block the opening 32 and an open position in which the first and second trapdoors 34, 36 free the opening 32.

According to one embodiment, the first and second trapdoors 34, 36 are made of composite material.

According to one configuration, the opening 32 is approximately rectangular and has first and second longitudinal sides 32.1, 32.2 parallel to the longitudinal direction DL and a median axis Am. The first and second trapdoors 34, 36 are substantially rectangular and symmetrical with respect to the median axis Am. The first trapdoor 34 comprises a first longitudinal edge 34.1 (approximately parallel to the median axis Am) linked to the first side 32.1 of the opening 32 by a first articulation 38 having a pivoting axis A38 approximately parallel to the median axis Am, and a second free edge 34.2 positioned approximately on the median axis Am when the first trapdoor 34 is in closed position. The first trapdoor 34 also comprises first and second transverse edges 34.3, 34.4 linking the first longitudinal edge 34.1 and the free edge 34.2.

The second trapdoor 36 comprises a first longitudinal edge 36.1 (approximately parallel to the median axis Am) linked to the second side 32.2 of the opening 32 by a second articulation 40 having a pivoting axis A40 approximately parallel to the median axis Am, and a second free edge 36.2 positioned approximately on the median axis Am when the second trapdoor 36 is in closed position. The second trapdoor 36 also comprises first and second transverse edges 36.3, 36.4 linking the first longitudinal edge 36.1 and the free edge 36.2.

When the first and second trapdoors 34, 36 are in closed position, as illustrated in FIG. 2, their two free edges 34.2, 36.2 are attached against one another. The first transverse edges 34.3, 36.3 of the first and second trapdoors 34, 36 are substantially aligned. The same applies for the second transverse edges 34.4, 36.4.

When the first and second trapdoors 34, 36 are in open position, as illustrated in FIG. 5, the two free edges 34.2, 36.2 are separated to allow the mast 18 and the turbine 22 of the ram air turbine 14 to pass.

The aircraft comprises actuators for displacing the first and second trapdoors 34, 36 from the closed position to the open position and vice versa.

The ram air turbine 14, the first and second trapdoors 34, 36, the first and second articulations 38, 40 and the actuators of the first and second trapdoors 34, 36 are not described further because they can be identical to those of the prior art.

The method for mounting the ram air turbine 14 comprises positioning it correctly then in fixing it by fixings 42 to the primary structure 10 of the aircraft.

Given the manufacturing tolerance ranges and the mounting uncertainties, the free edges 34.2, 36.2 of the first and second trapdoors 34, 36 are not necessarily parallel to the median axis Am and symmetrical with respect thereto. Consequently, the step of positioning the ram air turbine 14 comprises positioning the plane of displacement 26 of the ram air turbine 14 equidistant from the free edges 34.2, 36.2 of the first and second trapdoors 34, 36 and not with respect to the median axis Am of the opening 32.

According to a first embodiment, a method for positioning the ram air turbine 14 comprises a step of placing a first distance sensor 44 on the first trapdoor 34 and a second distance sensor 46 on the second trapdoor 36. The first and second distance sensors 44, 46 are configured to respectively transmit first and second signals S1, S2 corresponding to values measured over time of a separation between each of the first and second distance sensors 44, 46 and at least one target that is mobile and secured to the ram air turbine 14, being displaced in the environment of said first and second distance sensors 44, 46.

According to this first embodiment, the first and second distance sensors 44, 46 are oriented towards one another.

According to a second embodiment, the first and second distance sensors 44, 46 are positioned on the ram air turbine 14, for example on the mast 18 or on the blades 22.1, 22.2, and oriented respectively towards first and second targets secured to the first and second trapdoors 34, 36.

The positioning method comprises a step of pivoting the mast 18 between the retracted and deployed positions, the first and second trapdoors 34, 36 being in open position, a step of analyzing the first and second signals S1 and S2 and, possibly, a step of repositioning the ram air turbine 14 based on the step of analyzing the first and second signals S1 and S2.

During the pivoting movement of the mast 18, the first signal S1 has a first extreme value VM1 corresponding to the smallest real separation between the first distance sensor 44 and the target. This first extreme value VM1 can be a maximum value or a minimum value.

In parallel, the second signal S2 has a second extreme value VM2 corresponding to the smallest real separation between the second distance sensor 46 and the target. This second extreme value VM2 can be a maximum value or a minimum value.

Figure 6:
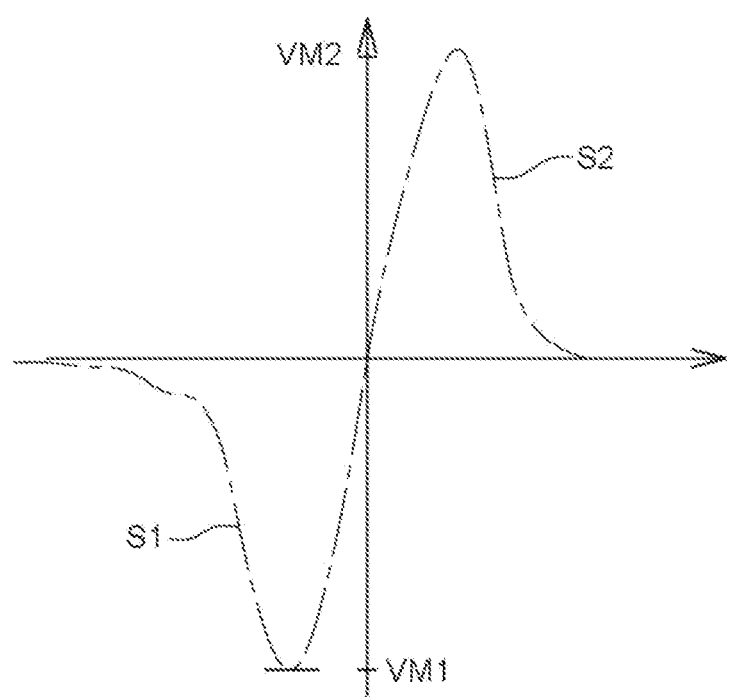
FIG. 6 is a diagram illustrating signals transmitted by distance sensors when the ram air turbine is correctly positioned.

When the first and second extreme values VM1, VM2 of the first and second signals S1, S2 are equal, as illustrated in FIG. 6, then the ram air turbine 14 is correctly positioned and can be fixed onto the primary structure 10 of the aircraft.

Figure 7:
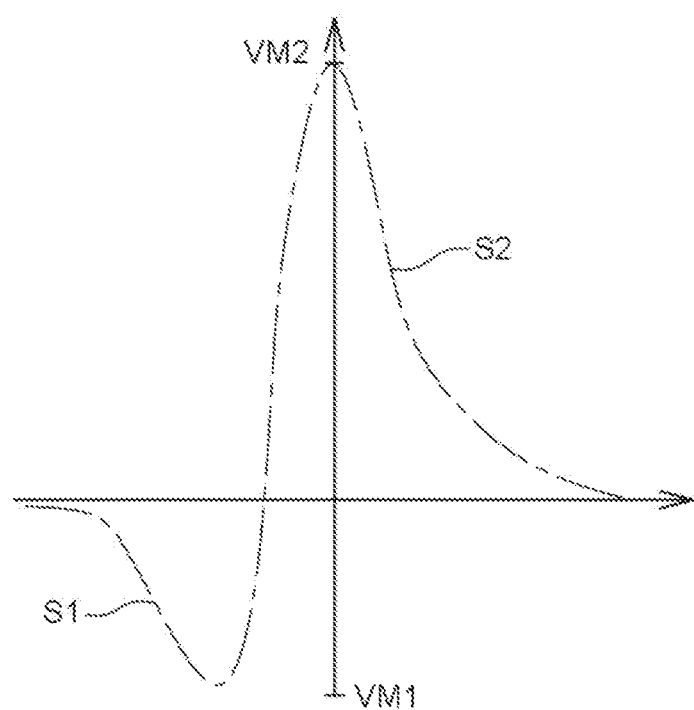
FIG. 7 is a diagram illustrating signals transmitted by distance sensors when the ram air turbine is not correctly positioned.

If the first and second extreme values VM1, VM2 of the first and second signals S1, S2 are not equal, as illustrated in FIG. 7, then the ram air turbine 14 is not correctly positioned. The steps of pivoting the mast 18, of analyzing the first and second signals S1, S2 and of repositioning the ram air turbine 14 based on the analysis of the first and second signals S1 and S2 are repeated until the first and second extreme values VM1, VM2 of the first and second signals S1, S2 are equal.

According to one embodiment, each first or second distance sensor 44, 46 is an eddy current sensor. This type of sensor makes it possible to obtain contactless measurements, dynamically and in a cramped zone.

When the first and second distance sensors 44, 46 are added onto the first and second trapdoors 34, 36, at least one of the metal blades 22.1, 22.2 ensures the target function. As a variant, any other metal part of the ram air turbine 14 or added onto the ram air turbine 14 could ensure the target function.

When the first and second distance sensors 44, 46 are added onto the ram air turbine 14, then, for each of the first and second trapdoors 34, 36, any metal part of the first or second trapdoor 34, 36 or added onto the first or second trapdoor 34, 36 ensures the target function. When the first and second trapdoors 34, 36 are made of composite material, a self-adhesive metal strip is affixed onto each of them to ensure the target function.

According to one embodiment, when the first and second distance sensors 44, 46 are added onto the first and second trapdoors 34, 36, the first and second distance sensors 44, 46 are positioned at a same distance from the free edges 34.2, 36.2 of the first and second trapdoors 34, 36. According to one configuration, the first and second distance sensors 44, 46 are respectively adjacent to the free edges 34.2, 36.2 of the first and second trapdoors 34, 36.

In addition, the first and second distance sensors 44, 46 are positioned at a same distance from the first transverse edges 34.3, 36.3 of the first and second trapdoors 34, 36.

Whatever the embodiment, the first and second distance sensors 44, 46 are positioned so that the first and second extreme values VM1, VM2 are the greatest possible in absolute value.

According to one configuration, the first and second distance sensors 44, 46 are differentially mounted so that the first and second signals S1, S2 are positioned on either side of an x axis, as illustrated in FIGS. 6 and 7. Thus, when the ram air turbine 14 is correctly positioned, the first and second signals S1, S2 form lobes that are substantially symmetrical with respect to the origin.

According to one embodiment, the first and second distance sensors 44, 46 are configured so that each first or second signal S1, S2 has an amplitude, corresponding to the first or second extreme value VM1, VM2, that is substantially proportional to the real minimum separation separating the first or second distance sensor 44, 46 and its target.

According to one procedure, the positioning method comprises a step of determining a ratio between the first or second extreme value VM1, VM2 of the first or second signal S1, S2 and the real separation measured by performing series of measurements with gauge blocks.

According to one procedure, knowing this ratio, during the analysis of the first and second signals S1, S2, the positioning method comprises a step of comparing the first and second extreme values VM1, VM2 and a step of determining, based on the comparison, a direction and a value of displacement of the ram air turbine 14 for it to be correctly positioned.

The positioning method of the invention allows a more reliable and reproducible positioning of the ram air turbine 14.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for positioning a ram air turbine when mounting same on a primary structure of an aircraft, the ram air turbine comprising a mast configured to pivot between deployed and retracted positions and a turbine secured to the mast and provided with blades, the aircraft comprising first and second trapdoors each having a free edge and configured to occupy a closed position in which the free edges are attached to one another and an open position in which the free edges are separated to allow the mast to pivot, wherein the positioning method comprises:
   placing a first distance sensor on a first element out of the first trapdoor and the ram air turbine, a second distance sensor on a second element out of the second trapdoor and the ram air turbine, the first and second distance sensors being configured to respectively transmit first and second signals corresponding to values measured over time of a separation between each of the first and second distance sensors and at least one mobile target secured to a third element out of the first trapdoor and the ram air turbine different from the first element for the first distance sensor and to a fourth element out of the second trapdoor and the ram air turbine different from the second element for the second distance sensor, pivoting the mast between the retracted and deployed positions, analyzing the first and second signals, and if necessary, repositioning the ram air turbine based on the step of analyzing the first and second signals.

2. The positioning method according to claim 1, wherein the first signal comprises a first extreme value corresponding to a smallest separation between the first distance sensor and the at least one mobile target, and wherein the second signal comprises a second extreme value corresponding to a smallest separation between the second distance sensor and the at least one mobile target.

3. The positioning method according to claim 2, wherein when the first and second extreme values of the first and second signals are equal, the ram air turbine is correctly positioned.

4. The positioning method according to claim 2, wherein if the first and second extreme values of the first and second signals are not equal, the steps of pivoting the mast, of analyzing the first and second signals and of repositioning the ram air turbine based on the step of analyzing the first and second signals are repeated until the first and second extreme values of the first and second signals are equal.

5. The positioning method according to claim 2, wherein the first and second distance sensors are configured so that each first or second extreme value of the first or second signal is substantially proportional to a real minimum separation separating the first or second distance sensor and its target.

6. The positioning method according to claim 5, wherein the positioning method comprises determining a ratio between the first or second extreme value of the first or second signal and the real minimum separation, comparing the first and second extreme values, and determining, based on the comparison step and the determined ratio, a direction and a value of displacement of the ram air turbine for the ram air turbine to be correctly positioned.

7. The positioning method according to claim 1, wherein each first or second distance sensor is an eddy current sensor.

8. The positioning method according to claim 1, wherein the first and second distance sensors are differentially mounted.

9. The positioning method according to claim 1, wherein the first sensor is fixed onto the first trapdoor, and wherein the second sensor is fixed onto the second trapdoor, at least one of the metal blades ensuring a functioning of the target.

10. The positioning method according to claim 1, wherein the first and second sensors are fixed onto the ram air turbine, each of the first and second trapdoors comprising a metal target.

* * * * *